United States Patent
Avudaiyappan et al.

(10) Patent No.: US 12,007,885 B2
(45) Date of Patent: Jun. 11, 2024

(54) FETCHING NON-ZERO DATA

(71) Applicant: Microsoft Technology Licensing, LLC, Redmond, WA (US)

(72) Inventors: Karthikeyan Avudaiyappan, Sunnyvale, CA (US); Jeffrey A Andrews, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 17/729,931

(22) Filed: Apr. 26, 2022

(65) Prior Publication Data

US 2023/0342291 A1      Oct. 26, 2023

(51) Int. Cl.
*G06F 12/02*      (2006.01)
*G06F 17/16*      (2006.01)

(52) U.S. Cl.
CPC ............ *G06F 12/023* (2013.01); *G06F 17/16* (2013.01); *G06F 2212/251* (2013.01)

(58) Field of Classification Search
CPC ... G06F 12/023; G06F 17/16; G06F 2212/251
See application file for complete search history.

(56) References Cited

U.S. PATENT DOCUMENTS

| | | | |
|---|---|---|---|
| 6,961,057 B1 | 11/2005 | Van Dyke et al. | |
| 10,521,489 B2 * | 12/2019 | Borje | G06Q 10/04 |
| 10,565,207 B2 * | 2/2020 | Huang | H03M 7/3066 |
| 11,127,167 B2 * | 9/2021 | Frumkin | G06T 9/002 |
| 11,373,120 B2 * | 6/2022 | Klein | G06F 17/16 |
| 11,443,014 B1 * | 9/2022 | Wang | G06F 17/16 |
| 2012/0143932 A1 * | 6/2012 | Fossum | G06F 17/16 |
| | | | 708/203 |
| 2018/0164866 A1 | 6/2018 | Turakhia et al. | |
| 2021/0271736 A1 * | 9/2021 | He | G06F 7/06 |

OTHER PUBLICATIONS

"International Search Report and Written Opinion Issued in PCT Application No. PCT/US23/012653", dated May 17, 2023, 10 Pages.

* cited by examiner

*Primary Examiner* — Prasith Thammavong
(74) *Attorney, Agent, or Firm* — Fountainhead Law Group P.C.

(57) ABSTRACT

Embodiments of the present disclosure include techniques storing and retrieving data. In one embodiment, sub-matrices of data are stored as row slices and column slices. A fetch circuit determines if particular slices of one sub-matrix, when combined with corresponding slices of another sub-matrix, produce a zero result and need not be retrieved. In another embodiment, the present disclosure includes a memory circuit comprising memory banks and sub-banks. The sub-banks store slices of sub-matrices. A request moves between serially configured memory banks and slices in different sub-banks may be retrieved at the same time.

20 Claims, 7 Drawing Sheets

A-tile Bit Mask
501

B-tile Bit Mask
502

*Fig. 5*

A-tile SliceMask
601

B-tile SliceMask
602

*Fig. 6*

FETCHING NON-ZERO DATA

BACKGROUND

The present disclosure relates generally to retrieving data, and in particular, to retrieving matrix data from a memory.

Memory circuits are circuits designed to store digital data. Such circuits typically have an associated access time, which is the time it takes to retrieve data from the memory. In many contemporary applications, there is a need to retrieve increasingly large volumes of data from a memory in shorter amounts of time. This retrieval time is often referred to as the memory bandwidth, and it may be advantageous to develop memory retrieval techniques that optimize data retrieval for a given memory bandwidth.

For example, machine learning (ML) models are often stored in memories as large matrices of data values. In some cases, ML models may comprise a high level of sparsity in their matrices. Sparse multiply-accumulator (MAC) array designs may be used to speed-up sparse matrix multiplications. For instance, for a sparse MAC array that multiplies A and B matrices every cycle and strives to achieve a speed-up of N, the A and B matrices it fetches may be N times bigger in the inner dimension. Consider, as another example, a MAC array that performs the following multiplication in one cycle: A (16×16)*B (16×16) to produce C (16×16). To achieve a factor of four (4) speed-up, the A and B input operands fetched from memory in one cycle by the MAC may be (16×64) and (64×16) respectively. This places enormous bandwidth pressure on memories that supply these A and B operands to a sparse MAC array.

Embodiments described herein advantageously reduce high bandwidth demands imposed on memories.

BRIEF DESCRIPTION OF THE DRAWINGS

FIG. 5 illustrates example bit masks according to an embodiment.

FIG. 6 illustrates example slice masks according to an embodiment.

DETAILED DESCRIPTION

Described herein are techniques for storing and retrieving data in memories. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
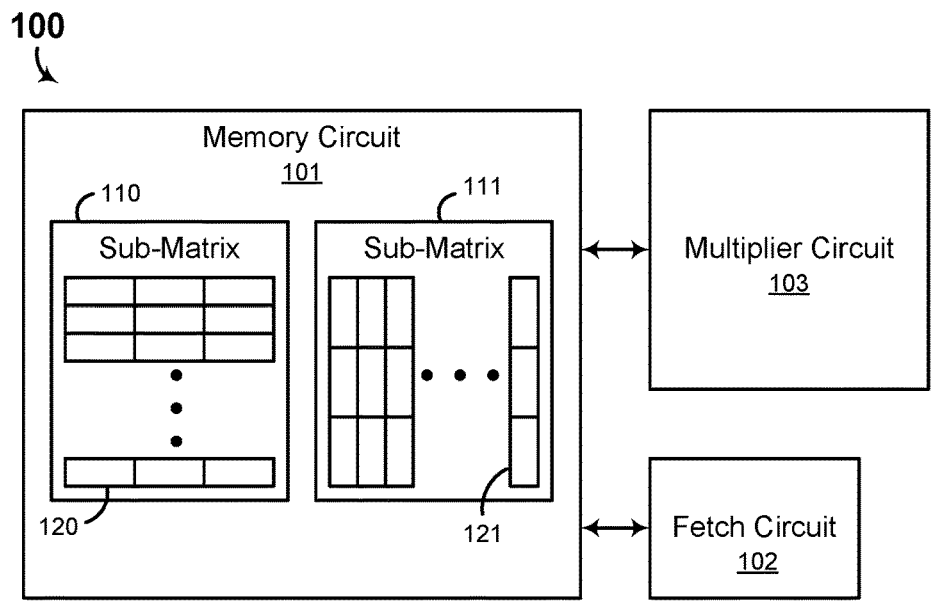
FIG. 1 illustrates a circuit for storing and retrieving data according to an embodiment.

FIG. 1 illustrates a circuit 100 for storing and retrieving data according to an embodiment. Circuit 100 includes memory circuit 101, multiplier circuit 103, and fetch circuit 102. Memory circuit 101 may store data that is retrieved and loaded into multiplier circuit 103, for example. The data may be machine learning data comprising large matrices of data values that are retrieved and loaded into a multiplier circuit 103, which may be a multiply-accumulator circuit configured to perform matrix multiplication, for example. Memory circuit 101 may be a single memory circuit, such as a static random access memory (SRAM, aka high speed cache), or multiple memory circuits, for example. Memory circuit 101 is shown here as a single memory for illustrative purposes.

Features and advantages of the present disclosure include storing sub-matrices of data as slices in memory circuit 101 and selectively retrieving slices that produce non-zero results when multiplied against column slices to optimize the available memory bandwidth. For example, here, memory circuit 101 stores a first sub-matrix of data 110 as a plurality of row slices 120 comprising a plurality of data values. Similarly, memory circuit 101 stores a second sub-matrix of data 111 as a plurality of column slices 121 comprising a plurality of data values. In various applications, the data values of sub-matrix 110 and sub-matrix 111 may be multiplied together or otherwise combined. Accordingly, the present disclosure advantageously retrieves slices that do not result in a zero value when the slices are combined. In one embodiment, circuit 100 includes a fetch circuit 102, which may be a fetch-ahead state machine, for example. Fetch circuit 102 is configured to determine row slices 120 of the first sub-matrix of data 110 that produce a non-zero result when multiplied by a plurality of corresponding column slices 121 of the second sub-matrix of data 111. For example, in some embodiments, fetch circuit 102 analyzes the first sub-matrix 110 in memory circuit 101 to determine the row slices that produce non-zero results. The determined row slices 120 may then be retrieved from memory circuit 101 and loaded into another circuit, such as multiplier circuit 103, for example. For example, fetch circuit 102 may examine slices of two sub-matrices and determines that, based on the correlation between the two sub-matrix slices, which slices are to be fetched. In various example embodiments, the bandwidth of the memory may be optimized because only slices resulting in non-zero results are retrieved, while slices resulting in zero values may not be retrieved from memory circuit 101.

In one embodiment, sub-matrix 110 is matrix multiplied with sub-matrix 111 as part of a larger matrix multiplication described further below. Accordingly, each row slice 120 is multiplied with multiple column slices 121. Fetch circuit 102 determines, for the plurality of row slices, whether a particular row slice produces a zero or non-zero result when multiplied by a plurality of corresponding column slices. Accordingly, each row slice 120 may be combined with corresponding column slices 121 (e.g., column slices the particular row slice would be multiplied by during a matrix multiplication) to determine if any of the combinations result in zero. A row slice that combines will all corresponding column slices to produce only zero values may not be retrieved, thus more efficiently using the available retrieval bandwidth of memory circuit 101, for example. Similarly, fetch circuit 102 may determine column slices 121 of the sub-matrix 111 that produce a non-zero result when multiplied by a plurality of corresponding row slices of the sub-matrix 110, and the determined column slices are retrieved from memory circuit 101. For applications with high sparsity levels (e.g., many zero values in the two matrices being combined), the present techniques may result in advantageous speed ups of the system because less data needs to be retrieved from memory, thereby reducing the impact of memory bandwidth on system performance.

Figure 2:
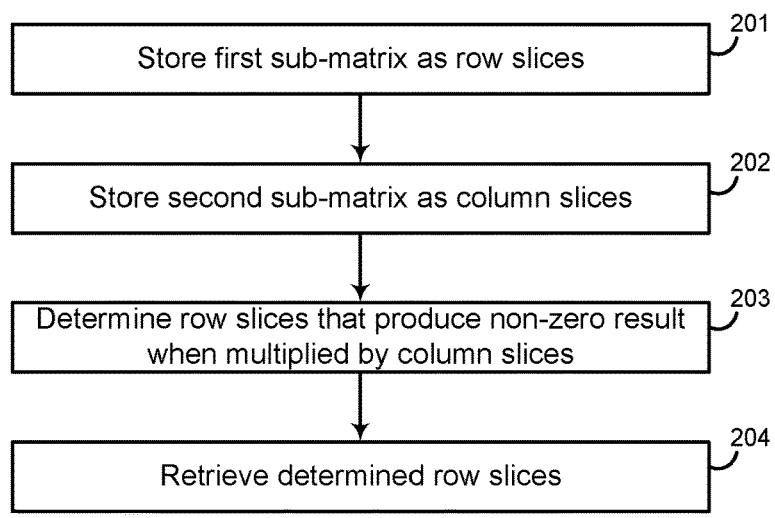
FIG. 2 illustrates a method of storing and retrieving data according to an embodiment.

FIG. 2 illustrates a method of storing and retrieving data according to an embodiment. For example, at 201, a first sub-matrix of data is stored in at least one memory as a plurality of row slices comprising a plurality of data values. At 202, a second sub-matrix of data is stored in the at least one memory as a plurality of column slices comprising a plurality of data values. At 203, the system determines the row slices of the first sub-matrix of data that produce a non-zero result when multiplied by a plurality of corresponding column slices of the second sub-matrix of data. At 204, the determined row slices are retrieved from the at least one memory. Additionally, the system may determine column slices of the second sub-matrix of data that produce a non-zero result when multiplied by a plurality of corresponding row slices of the first sub-matrix of data. Thus, the determined row and column slices may be retrieved from at least one memory.

Figures 3, 4:
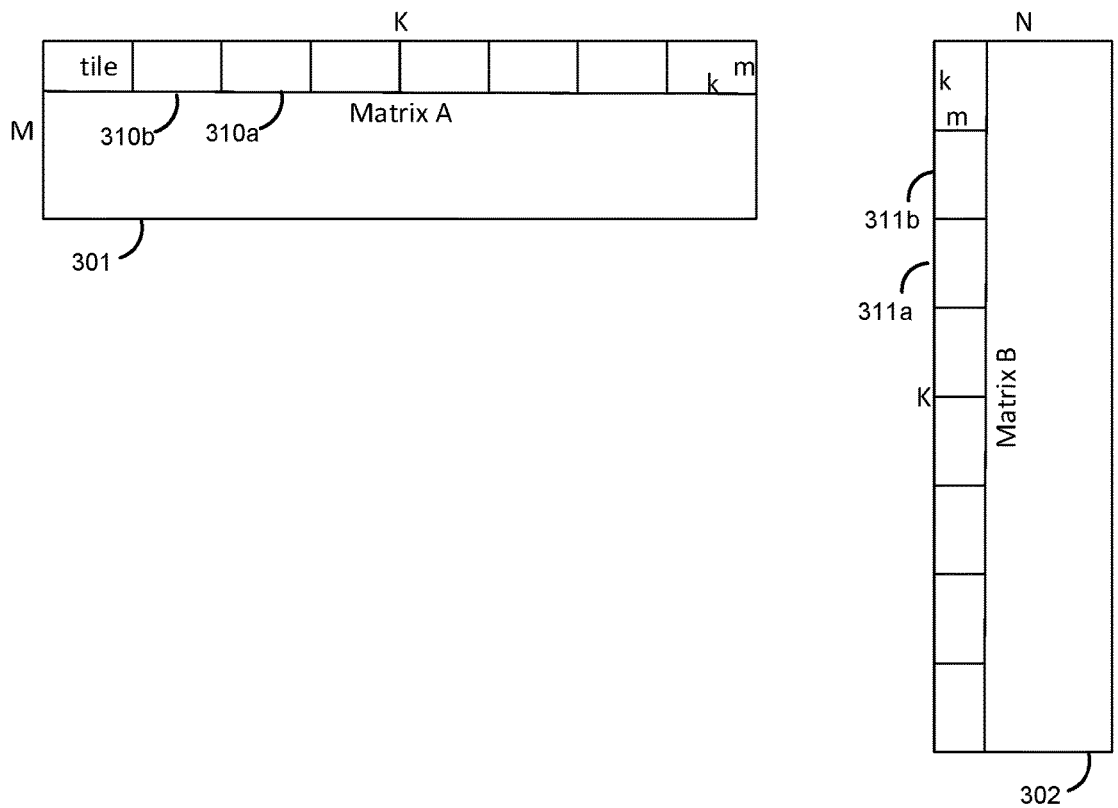
FIG. 3 illustrates an example matrix and tiles according to an embodiment.
FIG. 4 illustrates an example of row and column slices according to an embodiment.

FIG. 3 illustrates an example matrix and tiles according to an embodiment. FIG. 3 illustrates multiplication of two larger matrices A 301 and B 302. Matrices A and B may be divided into a plurality of sub-matrices (aka "tiles"), such as sub-matrix 310a of matrix A and sub-matrix 311a of matrix B. The inner dimension of the two matrices is K. The outer dimension of A and B matrices are M and N, respectively. The sub-matrices of matrix A have dimension m*k, and matrix A, tiles 310a and data are configured in row-major order, where locations of data elements and tiles are increase row by row. Similarly, sub-matrices of matrix B have dimension k*n, and matrix B, tiles 311a, and data are configured in column-major order, where locations of data elements and tiles increase column by column. The sub-matrices of matrices may be stored in memory and retrieved from memory for multiplication by a multiplier circuit, for example.

In some embodiments, a fetch circuit may analyze row slices of two sub-matrices while other sub-matrices are being retrieved (e.g., and loaded into a multiplier). For example, a fetch circuit may determine row slices of the first sub-matrix of data 310a that produce a non-zero result when multiplied by a plurality of corresponding column slices of the second sub-matrix of data 311a while row slices of a third sub-matrix of data 310b that produce a non-zero result when multiplied by a plurality of corresponding column slices of the fourth sub-matrix of data 311b are being retrieved. In other words, a fetch circuit may determine which slices to retrieve for one pair of sub-matrices "on the fly" while other sub-matrices are being retrieved, for example. Accordingly, sub-matrices of matrices A and B may be processed sequentially, where sub-matrix 310a and sub-matrix 310b are from a first matrix of data 301, and sub-matrix 311a and sub-matrix 311b are from a second matrix of data 302.

FIG. 4 illustrates an example of row and column slices according to an embodiment. This example illustrates slices of two sub-matrices 401 and 402 that produce a non-zero result when multiplied by corresponding slices in the other sub-matrix. For example, the slices in sub-matrix 401 may be arranged in row major order such that the slice in the (0,0) position has a relative address of A0, the slice in the (0,2) position has an address of A0+2, and the addresses proceed across each row left to right and then repeat top to bottom. Similarly, the slices in sub-matrix 402 may be arranged in column major order such that the slice in the (0,0) position has a relative address of B0, the slice in the (2,0) position has an address of B0+2, and the addresses proceed down each column top to bottom and then repeat left to right. In the present example, each sub-matrix may be 16×16 and each slice may comprise 4 values that are 4 bytes each. The addresses of row slices that combine with column slices to produce a non-zero result are shown as A0 plus a row slice number offset (e.g., A0, A0+2, A0+5, . . . ) and the addresses of the column slices that combine with row slices to produce a non-zero result are shown as B0 plus a column slice number offset (e.g., B0, B0+5, B0+10, . . . ). As mentioned previously, there are multiple cases where a slice may produce a zero result, and thereby be eliminated from the retrieval. First, if the row slice is all zeros, as indicated by a bit mask for sub-matrix A described below, the row slice is eliminated from the retrieval. Second, if all the column slices that a particular row slice is combined with are all zeros, also as indicated by a bit mask for sub-matrix B, then the row slice is eliminated from the retrieval (e.g., along with all those all-zero column slices). Further, if the combination of a row slice with corresponding column slices produces a zero result, then the row slice is eliminated from the retrieval.

FIG. 5 illustrates example bit masks according to an embodiment. Features and advantages of some embodiments may include bit masks corresponding to sub-matrices that indicate whether a particular slice of the sub-matrix is all zero values. In this example, a sub-matrix has a corresponding bit mask 501. The bit mask 501 may comprise 1-bit for each row slice of a sub-matrix, and the value of the bit corresponds to the number of non-zero (NZ) values in each slice of the sub-matrix. A '1' may indicate that a corresponding row slice has at least 1 NZ value. A '0' may indicate that a corresponding row slice has all zero values (e.g., and does not need to be retrieved). Similarly, bit mask 502 may comprise 1-bit for each column slice of a sub-matrix. A '1' may indicate that a corresponding column slice has at least 1 NZ value. A '0' may indicate that a corresponding column slice has all zero values (e.g., and does not need to be retrieved). The bit mask may be generated, for example, by applying the values of each slice to a logical OR function, for example.

FIG. 6 illustrates example slice masks according to an embodiment. In some cases, slices may be eliminated from retrieval even when they contain NZ values (e.g., when they combine to produce a zero value). Accordingly, a slice mask data structure may be used to track slices to be retrieve, which may exclude slices having all zeros and slices that combine to produce a zero value. Slice mask 601 illustrates row slices to be retrieved (e.g., having a '1') and row slices that either have all zero values, are combined with column slices having all zeros, or combine with column slices to produce a zero result. For example, comparing the bit mask 501 position (0,1) to the slice mask 601 position (0,1), it can be seen that the bit mask has at least one NZ value, but the slice mask is blank (e.g., the slice is not retrieved). The row slice in the (0,1) position may combine with corresponding column slices to produce zero results, and thus there the row slice is not retrieved even though the row slice may not be all zeros, for example. Accordingly, in some embodiments, a fetch circuit may determine, for a plurality of row slices, whether a particular row slice produces a zero or non-zero result when multiplied by a plurality of corresponding column slices. For instance, the row slice in the (0,0) position may be combined with the column slices in the first row of sub-matrix 602 during matrix multiplication. Thus, if the 0,0 slice is NZ, a fetch circuit may determine of the product of the 0,0 row slice is zero when multiplied by the first row of column slices in sub-matrix 602. Each row slice may be similarly combined, in the fetch circuit, to determine if all combinations of the row slice produce a zero result. If so, the row slice designated in the slice mask as not retrieved (e.g., blank; or not included in the slice mask structure).

Figure 7:
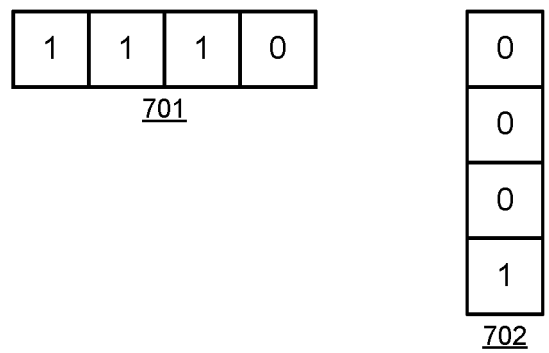
FIG. 7 illustrates an example row slice and column slice combination according to an embodiment.

FIG. 7 illustrates an example row slice and column slice combination according to an embodiment. As mentioned above, some row and column slices may be NZ and yet still combine to produce a zero result and can thus be eliminated from a retrieval. Here, a NZ row slice 701 multiplied by a NZ column slice 702 produces a zero result. In some embodiments, the fetch circuit (mentioned above) logically ANDs values of non-all zero row slices of one sub-matrix with corresponding values of the column slices of another sub-matrix to produce a plurality of results (here, 1 AND 0, 1 AND 0, 1 AND 0, 0 AND 1). The fetch circuit then logically ORs the plurality of results (here, 0 OR 0 OR 0 OR 0=0) to eliminate a plurality of non-all zero row slices producing a zero result from the determined row slices to be retrieved.

Figure 8:
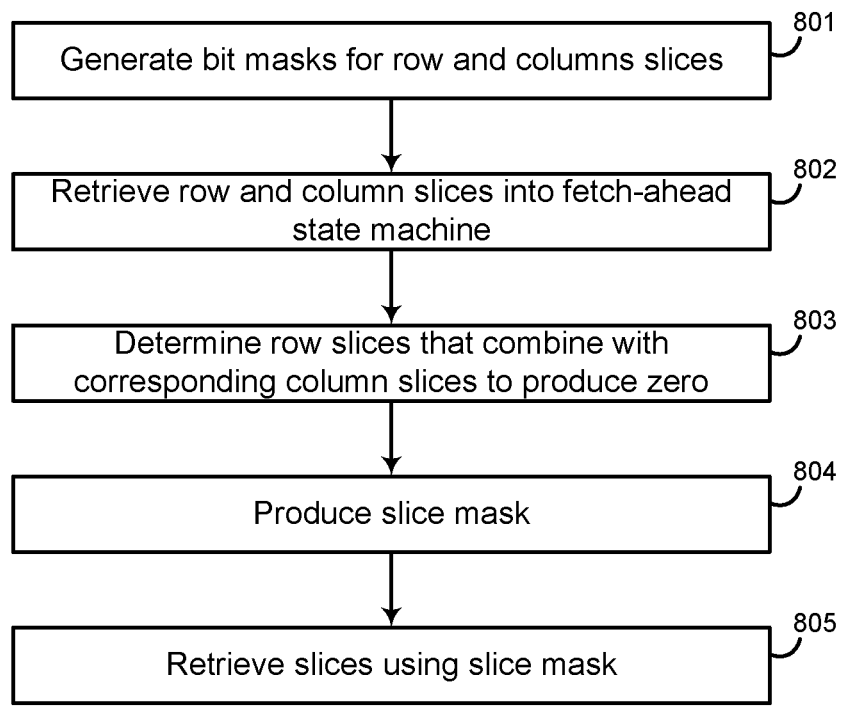
FIG. 8 illustrates a method of determining slices to retrieve according to an embodiment.

FIG. 8 illustrates a method of determining slices to retrieve according to an embodiment. At 801, bit masks may be generated for row slices and column slices of sub-matrices. The bit masks may designate if a particular slice is all zero values. At 802, row and column slices are retrieved into a fetch circuit, such as a fetch-ahead state machine. At 803, the fetch circuit may determine row slices that combine with corresponding column slices to produce a zero result. At 804, a slice mask is generated. In one embodiment, a fetch circuit receives a bit mask comprising 1 bit per row slice of a first sub-matrix. Particular row slices of the first sub-matrix having a first bit mask value (e.g., 0) indicating the particular row slices comprise all zeros are eliminated from the determined row slices to be retrieved. Such row slices may not be included in a slice mask data structure as illustrated below, for example. After eliminating row slices comprising all zeros, the fetch circuit may determine row slices of the first sub-matrix that produce a zero result when multiplied by a plurality of corresponding column slices of the second sub-matrix to eliminate the row slices from the determined row slices to be retrieved.

In some embodiments, the fetch circuit generates a data structure specifying row slices to be retrieved, including row slices that produce a non-zero result when multiplied by corresponding column slices, for example. For example, a data structure may be generated that specifies addresses of a plurality of sub-matrices and a mask specifying the location of row slices to be retrieved. The following is an example data structure may be used as part of a fetch request:

```
struct SpecialFetchRequestAddress { //addresses of relevant slices
    INT32 TileAddr[4],
    bit SliceMask[4][64] // tile 1 SliceMask, tile 2 SliceMask, tile 3 SliceMask, tile 4
    SliceMask, where each SliceMask is 64 bits wide. this variable has four 64b values,
    corresponding to four tiles' SliceMask bits - each tile has 64 SliceMask bits.
};
```

In this example, "INT32 TileAddr[4]" may hold 4 sub-matrix (tile) addresses (e.g., tile 1 address, tile 2 address, tile 3 address, tile 4 address). Each address is 32 bits wide (INT32), and thus this variable has four 32b values corresponding to four tiles to be fetched. The fetch request shown above may fetch up to 4 tiles in the inner dimension of the matrix at any one time, for example. The "SliceMask" field carries the slice mask bits of the 4 tiles, specifying the slices to be retrieved from the tile. Each tile in this example has 64 slices. Although the data structure shown above is capable of fetching up to 4 tiles, in other embodiments it is possible to expand the size of this structure to fetch more tiles' slices in one fetch request.

Additionally, the fetch circuit may generate a second data structure storing retrieved row slices and a mask specifying the location of the row slices within the sub-matrices. The following is an example data structure for storing the retrieved data:

```
struct SpecialFetchRequestData {
    INT8 TileData[256];
    bit SliceMask[4][64];
};
```

The above data structure stores slice data from multiple tiles. "INT8 TileData[256]" may store 16×16 NZ values that are ach 8 bits (1 byte) wide, for a total of 256 INT8 values (256 bytes), for example. The slices of data are mapped to 4 particular sub-matrices using the "bit SliceMask[4][64]." This struct can contain 256 bytes of data, which corresponds to up to 4 tiles' slices. The SliceMask indicates that 4 tiles' slices are present in this structure and that each tile has 64 slices. The number of tiles present in SpecialFetchRequestData matches that of SpecialFetchRequestAddr.

The fetch circuit, which generates the fetch request, thus retrieves data of non-zero slices across the 4 tiles having 256 bytes capacity using SpecialFetchRequestData structure.

Figure 9:
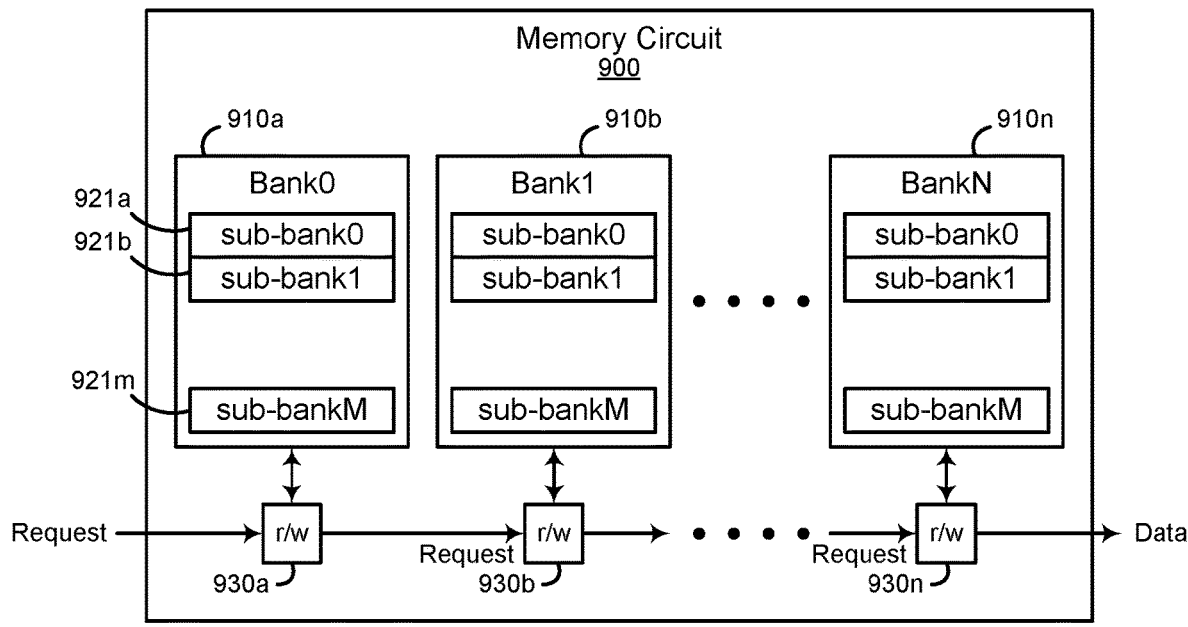
FIG. 9 illustrates a memory circuit for storing and retrieving data according to an embodiment.

FIG. 9 illustrates a memory circuit 900 for storing and retrieving data according to an embodiment. Features and advantages of the present disclosure further include a memory circuit 900 configured to optimize the storage and retrieval of sub-matrices comprising slices as described herein. In one embodiment, memory circuit 900 includes a plurality of memory banks 910*a-n* (e.g., Bank0-BankN) configured in series. A memory bank may store one or more whole sub-matrices (aka tiles). As indicated above, a sub-matrix may comprise a plurality of slices comprising multiple data values (aka elements). Accordingly, memory banks 910*a-n* comprise a plurality of sub-banks 921*a-m*. Sub-banks 921*a-m* are used to store particular slices for the sub-matrices. Each sub-bank may store a same slice position (or slice number) for multiple tiles. For example, if a first sub-matrix (SM1) is divided into 64 slices of 4 data values each, then the 4 values of SM1/slice0 may be stored in sub-bank0 921*a* of bank0 910*a*, the 4 values of SM1/slice1 may be stored in sub-bank1 921*b* of bank0 910*a*, and so on up to the 4 values of SM1/slice63 stored in sub-bank63 of bank0 910*a*, for example. Similarly, if a second sub-matrix (SM2) is stored in bank0 910*a*, then the 4 values of SM2/slice0 may be stored in sub-bank0 921*a* of bank0 910*a*, the 4 values of SM2/slice1 may be stored in sub-bank1 921*b* of bank0 910*a*, and so on up to the 4 values of SM2/slice63 stored in sub-bank63 of bank0 910*a*, for example. Slices of tiles stored in other banks similarly share the same sub-bank locations. The slices of SM1 may be stored across a first address range (e.g., 0-256 bytes, for a 256 element sub-matrix of 1-byte elements) and the slices of SM2 may be stored across a second address range (e.g., 256-512 bytes, for a 256 element sub-matrix of 1-byte elements), for example. In another embodiment described below, the memory banks are configured to store one or more whole sub-matrices using low address interleaving, where address ranges increase sequentially from bank to bank cyclically. Accordingly, sub-matrices may be stored across a plurality of banks 910a-n, where slices of each sub-matrix are stored in corresponding sub-banks 921a-m for efficient retrieval.

As mentioned above, it may be desirable to retrieve some, but not all, slices of a sub-matrix. Accordingly, a request to retrieve particular slices from one more particular sub-matrices may be received by memory circuit 900. The request sequentially moves between the plurality of memory banks to retrieve the specified slices. The output of the request may be produced for a predetermined amount of data (e.g., 1 tile of data). The request may arrive at read/write memory bank interface (r/w) 930a and retrieve a subset of slices for one or more sub-matrices, move to read/write memory bank interface (r/w) 930b and retrieve a subset of slices for one or more other sub-matrices, and so on to produce the output data. As mentioned above, the predetermined amount of data retrieved may comprise one (1) sub-matrix of data, for example, using the output data structure described above (e.g., 256 bytes).

For example, for a 4:1 compression (aka "speed up"), a request may retrieve slices from up to 4 sub-matrices, but since the request only selects particular slices, the retrieved data may be the same size as 1 sub-matrix. For instance, in a case where slices from 4 256 byte sub-matrices are retrieved, the output data structure may be set to 256 bytes. In various cases, the retrieved 256 bytes may comprise some or all of the slices from all 4 stored sub-matrices, depending on the particular sparsity. For high sparsity levels, the retrieved output data may include slices from all 4 tiles.

Figure 10:
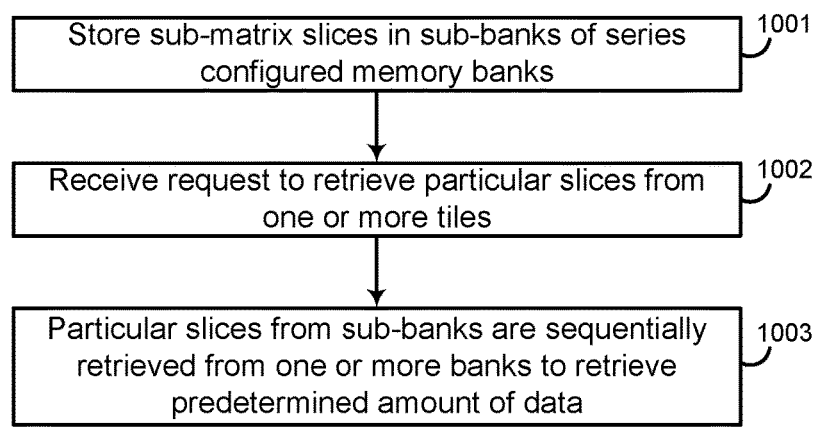
FIG. 10 illustrates another method for storing and retrieving data according to an embodiment.

FIG. 10 illustrates another method for storing and retrieving data according to an embodiment. At 1001, slices of a sub-matrix are stored in sub-banks of series configured memory banks. The memory banks may be referred to as series configure where a request moves from one bank to the next to retrieve data from each bank, for example. Whole sub-matrices (tiles) of a larger matrix may be stored in any one of a number of memory banks, where particular slice positions within each sub-matrix are stored in the same sub-bank across the memory bank. As described further below, each sub-bank may have an independent input/output interface, for example, which allows multiple slices to be retrieved for one or more tiles at the same time (e.g., one slice from multiple sub-banks for the same or different tiles simultaneously). At 1002, a request is received to retrieve particular slices for one or more tiles. At 1003, particular slices from sub-banks are sequentially retrieved from one or more banks. A request may retrieve particular slices from one or more tiles in a first bank, move to a second bank, retrieve other slices for one or more other tiles from the second bank, and so on until an output data structure is filled, for example. The output data for the tiles and slices may be output from the memory circuit in response to the request, and provided to other circuitry for further processing (e.g., a multiply-accumulator circuit, aka "MAC").

Figure 11:
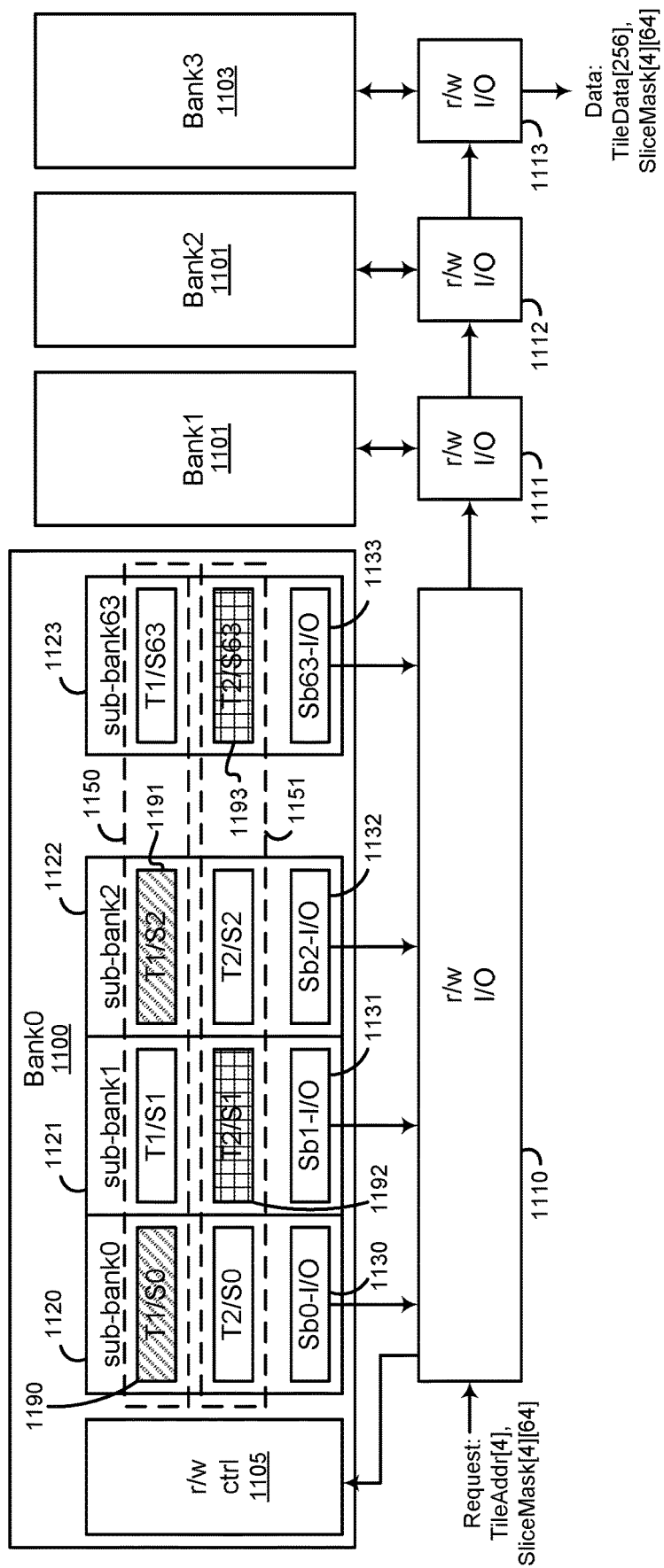
FIG. 11 illustrates another example memory according to another embodiment.

FIG. 11 illustrates an example memory circuit according to another embodiment. In this example, 2 tiles each comprising 64 slices are stored in 64 sub-banks 1120-1123 of memory bank 1100. For instance, tile1 1150 includes a slice T1/S0 in sub-bank0 1120, a slice T1/S1 in sub-bank1 1121, a slice T1/S2 in sub-bank2 1122, and so forth up to a 64th slice T1/S63 in sub-bank63 1123. Similarly, tile2 1151 includes a slice T2/S0 in sub-bank0 1120, a slice T2/S1 in sub-bank1 1121, a slice T2/S2 in sub-bank2 1122, and so forth up to a 64th slice T2/S63 in sub-bank63 1123. Non-zero slices of tile1 (1190 and 1191) and tile2 (1192 and 1193) are illustrated with hash lines. In this example, each sub-bank may comprise an input-output interface capable of producing a slice simultaneously with other sub-banks (e.g., in a single cycle). Accordingly, slices from multiple tiles may be advantageously retrieved from a bank at the same time and, in some embodiments, in a single cycle. As illustrated in this example, slices 1190, 1192, 1191 and 1193 from tile1 and tile2 may all be retrieved at the same time and in one cycle. It is to be understood that one or more tiles may be stored and similarly retrieved in any of the banks 1100-1103.

In this example, the memory circuit may be a 4 MB SRAM and each bank may store 1 MB. As mentioned above, a plurality of whole tiles may be stored across the banks of the memory using low address interleaving. For example, for 256 byte tiles and 4 banks, bank0 1100 may store tiles at Addr 0, Addr 4x256, Addr 8x256, and so on, bank1 1101 may store tiles at Addr 1x256, Addr 5x256, Addr 9x256, and so on, bank2 1102 may store tiles at Addr 2x256, Addr 6x256, Addr 10x256, and so on, and bank3 1103 may store tiles at Addr 3x256, Addr 7x256, Addr 11x256, and so on.

A request may include 4 32 bit tile addresses and 4 64 bit slice masks (e.g., one for each tile). The tile addresses may be one of the base tile addresses in one of the banks (0, 256 bytes, etc. . . . ). The slice mask may be used to access a particular sub-bank for particular slices. For example, the following request would select 2 tiles from bank0 and 1 tile each from banks 1 and 2:

```
SpecialFetchRequestAddress {
    {0x0, 0x100, 0x200, 0x400}, // 4 32bit addresses
    {0xFFFF, 0xFFFF, 0xFFFF, 0xFFFF_0000} //4 slice
masks
};
```

In the above example, the 9:8 bits of the address may be used to identify a particular bank. Accordingly, bank0 is selected twice (the 9:8 bits of 0x0 and 0x400 both resolve to the 0th bank). In this case, the slice mask bits for the first, second, and third tile (0xFFFF) select the lowest 16 slices, but the slice mask bits for the fourth tile (0xFFFF_0000) select the second group of 17-32 slices, which can be done at the same time because the sub-banks from bank0 are different.

In the next example, all the tiles are retrieved from bank0:

```
SpecialFetchRequestAddress {
    {0x0, 0x400, 0x800, 0xC00}, // 4 32bit addresses
    {0xFFFF, 0xFFFF_0000, 0xFFFF_0000_0000, 0xFFFF_0000_0000_0000} //4
slice
masks
};
```

For this request, the slice masks cause tile 1 to be retrieved from the lowest 16 slices, tile2 is retrieved from the next 16 slices, tile3 is retrieved from next 16 slices, and tile4 is retrieved from highest 16 slices (note that the FFFF bits are being shifted further left for each mask).

The following illustrates a slice mask for a tile that retrieves slices from non-adjacent sub-banks:
Slice Mask: 0x0001_0002_00F0_0001
Bits: 0000 0000 0000 0001//0000 0000 0000 0010//0000 0000 1111 0000//0000 0000 0000 0001

Accordingly, a retrieval request with this slice mask will retrieve 7 slices from the following 64 sub-banks where the bits are set to 1: 0, 20-23, 33, and 48.

Figure 12:
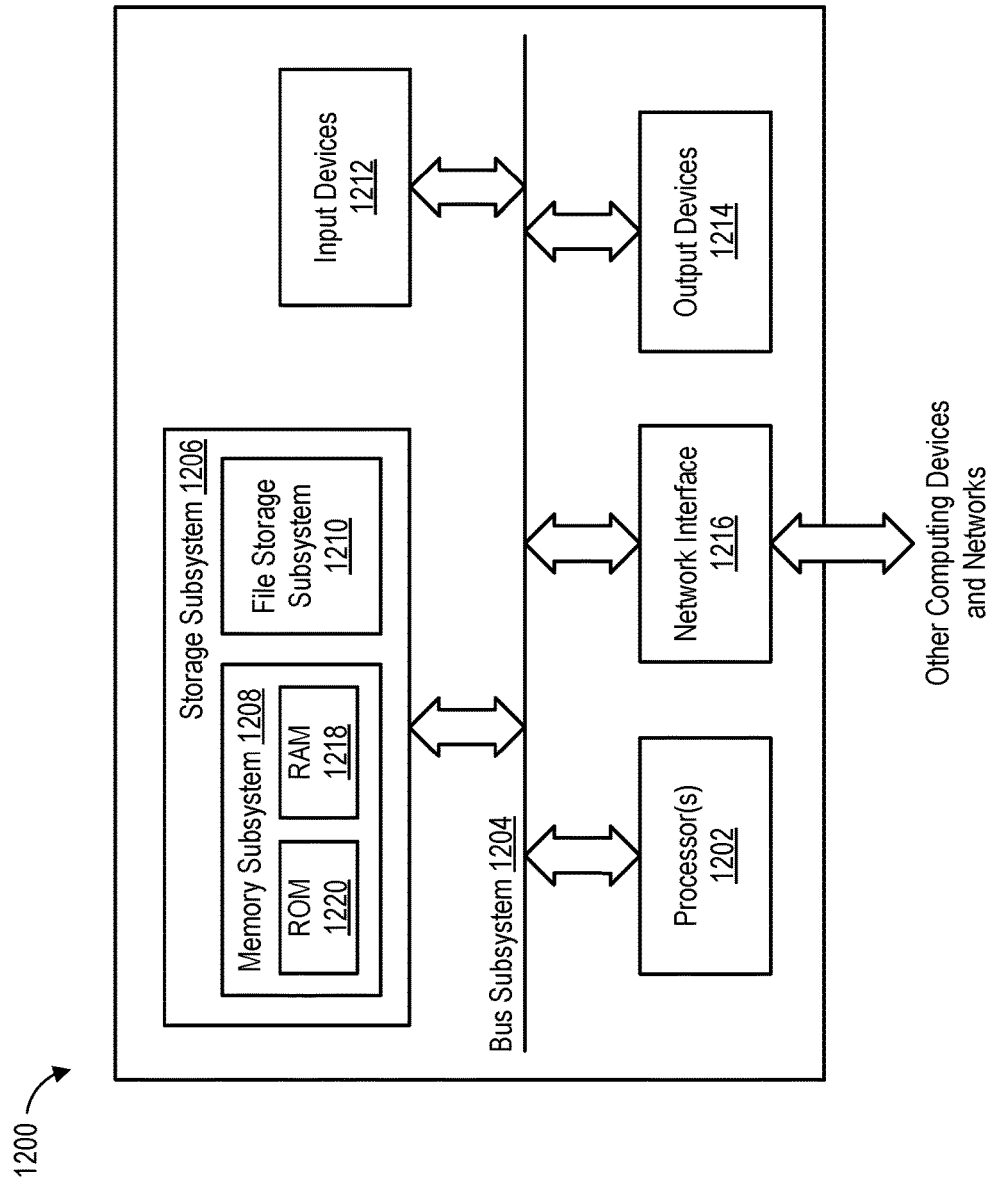
FIG. 12 illustrates a simplified block diagram of an example computer system used to execute program code according to various embodiments.

FIG. 12 illustrates a simplified block diagram of an example computer system used to execute program code according to various embodiments. In some embodiments, computer system 1200 executes a program comprising sets of instructions (program code) for performing some of the techniques described herein, including programs for loading and retrieving sub-matrices or code for generating logic circuits as described herein. As shown in FIG. 12, computer system 1200 includes one or more processors 1202 that communicate with a number of peripheral devices via a bus subsystem 1204. These peripheral devices may include a storage subsystem 1206 (e.g., comprising a memory subsystem 1208 and a file storage subsystem 1210) and a network interface subsystem 1216. Some computer systems may further include user interface input devices 1212 and/or user interface output devices 1214.

Bus subsystem 1204 can provide a mechanism for letting the various components and subsystems of computer system 1200 communicate with each other as intended. Although bus subsystem 1204 is shown schematically as a single bus, alternative embodiments of the bus subsystem can utilize multiple busses.

Network interface subsystem 1216 can serve as an interface for communicating data between computer system 1200 and other computer systems or networks. Embodiments of network interface subsystem 1216 can include, e.g., Ethernet, a Wi-Fi and/or cellular adapter, a modem (telephone, satellite, cable, ISDN, etc.), digital subscriber line (DSL) units, and/or the like.

Storage subsystem 1206 includes a memory subsystem 1208 and a file/disk storage subsystem 1210. Subsystems 1208 and 1210 as well as other memories described herein are examples of non-transitory computer-readable storage media that can store executable program code and/or data that may execute the functionality of embodiments of the present disclosure.

Memory subsystem 1208 includes a number of memories including a main random access memory (RAM) 1218 for storage of instructions and data during program execution and a read-only memory (ROM) 1220 in which fixed instructions are stored. File storage subsystem 1210 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1200 is illustrative and many other configurations having more or fewer components than system 1200 are possible.

FURTHER EXAMPLES

Each of the following non-limiting features in the following examples may stand on its own or may be combined in various permutations or combinations with one or more of the other features in the examples below.

In one embodiment, the present disclosure includes a circuit for storing and retrieving data comprising: at least one memory circuit storing a first sub-matrix of data as a plurality of row slices comprising a plurality of data values and storing a second sub-matrix of data as a plurality of column slices comprising a plurality of data values; and a fetch circuit, wherein the fetch circuit determines row slices of the first sub-matrix of data that produce a non-zero result when multiplied by a plurality of corresponding column slices of the second sub-matrix of data, and the determined row slices are retrieved from the at least one memory circuit.

In another embodiment, the present disclosure includes a method of storing and retrieving data comprising: storing a first sub-matrix of data in at least one memory as a plurality of row slices comprising a plurality of data values; storing a second sub-matrix of data in the at least one memory as a plurality of column slices comprising a plurality of data values; determining row slices of the first sub-matrix of data that produce a non-zero result when multiplied by a plurality of corresponding column slices of the second sub-matrix of data; and retrieving the determined row slices from the at least one memory.

In another embodiment, the present disclosure includes a non-transitory machine-readable medium storing a program executable by a computer for storing and retrieving data, the program comprising sets of instructions for: storing a first sub-matrix of data in at least one memory as a plurality of row slices comprising a plurality of data values; storing a second sub-matrix of data in the at least one memory as a plurality of column slices comprising a plurality of data values; determining row slices of the first sub-matrix of data that produce a non-zero result when multiplied by a plurality of corresponding column slices of the second sub-matrix of data; and retrieving the determined row slices from the at least one memory.

In one embodiment, the fetch circuit determines row slices of the first sub-matrix of data that produce a non-zero result when multiplied by a plurality of corresponding column slices of the second sub-matrix of data while row slices of a third sub-matrix of data that produce a non-zero result when multiplied by a plurality of corresponding column slices of the fourth sub-matrix of data are being retrieved.

In one embodiment, the first sub-matrix of data and the third sub-matrix of data are from a first matrix of data, and wherein the second sub-matrix of data and the fourth sub-matrix of data are from a second matrix of data.

In one embodiment, the at least one memory circuit stores a first mask corresponding to the first sub-matrix, wherein the first mask specifies row slices having at least one non-zero value.

In one embodiment, the fetch circuit eliminates row slices having all zero values from being retrieved based on the first mask.

In one embodiment, the fetch circuit analyzes the first sub-matrix in said at least one memory to determine the row slices that produce non-zero results.

In one embodiment, the fetch circuit determines, for a plurality of row slices, whether a particular row slice produces a zero or non-zero result when multiplied by a plurality of corresponding column slices.

In one embodiment, the fetch circuit receives a bit mask comprising 1 bit per row slice of the first sub-matrix, wherein particular row slices of the first sub-matrix having a first bit mask value indicating the particular row slices comprise all zeros are eliminated from the determined row slices to be retrieved.

In one embodiment, after eliminating row slices comprising all zeros, the fetch circuit determines first row slices of the first sub-matrix of data that produce a zero result when multiplied by a plurality of corresponding column slices of the second sub-matrix of data to eliminate the first row slices from the determined row slices to be retrieved.

In one embodiment, the fetch circuit logically ANDs values of remaining non-all zero row slices of the first sub-matrix with corresponding values of the column slices of the second sub-matrix to produce a plurality of results and logically ORs the plurality of results to eliminate a plurality of non-all zero row slices producing a zero result from the determined row slices to be retrieved.

In one embodiment, the first sub-matrix is stored in row major order and the second sub-matrix is stored in column major order.

In one embodiment, the first sub-matrix is a portion of a first matrix stored in row major order and the second sub-matrix is a portion of a second matrix stored in column major order.

In one embodiment, the fetch circuit generates at least one data structure specifying said row slices that produce a non-zero result when multiplied by corresponding column slices.

In one embodiment, the fetch circuit generates a first data structure specifying addresses of a plurality of sub-matrices and a mask specifying the location of said row slices that produce a non-zero result when multiplied by corresponding column slices across within the plurality of sub-matrices.

In one embodiment, the fetch circuit generates a second data structure storing retrieved row slices and a mask specifying the location of said row slices within the plurality of sub-matrices.

In one embodiment, the at least one memory circuit is a static random access memory.

In one embodiment, the determined row slices retrieved from the at least one memory circuit are loaded into a multiplier circuit.

In one embodiment, the fetch circuit determines column slices of the second sub-matrix of data that produce a non-zero result when multiplied by a plurality of corresponding row slices of the first sub-matrix of data, and the determined column slices are retrieved from the at least one memory circuit.

In another embodiment, the present disclosure includes a memory storage system comprising: a memory circuit comprising a plurality of memory banks configured in series, the memory banks comprising a plurality of sub-banks, wherein the memory banks are configured to store one or more whole sub-matrices comprising a plurality of slices, the slices comprising a plurality of data values, wherein particular slices of the sub-matrices are stored in corresponding sub-banks, and wherein a request to retrieve particular slices from one more particular sub-matrices sequentially moves between the plurality of memory banks to retrieve a predetermined amount of data.

In another embodiment, the present disclosure includes a method of storing and retrieving data comprising: storing a plurality whole sub-matrices in memory banks of a memory circuit comprising a plurality of said memory banks configured in series, the memory banks comprising a plurality of sub-banks, and the sub-matrices comprising a plurality of slices, the slices comprising a plurality of data values, wherein particular slices of the sub-matrices are stored in corresponding sub-banks; receiving a request to retrieve particular slices from one or more particular sub-matrices; retrieving the particular slices for one or more particular sub-matrices sequentially from one or more of the plurality of memory banks to retrieve a predetermined amount of data.

In another embodiment, the present disclosure includes a non-transitory machine-readable medium storing a program executable by a computer for storing and retrieving data, the program comprising sets of instructions for: storing a plurality whole sub-matrices in memory banks of a memory circuit comprising a plurality of said memory banks configured in series, the memory banks comprising a plurality of sub-banks, and the sub-matrices comprising a plurality of slices, the slices comprising a plurality of data values, wherein particular slices of the sub-matrices are stored in corresponding sub-banks; receiving a request to retrieve particular slices from one or more particular sub-matrices; retrieving the particular slices for one or more particular sub-matrices sequentially from one or more of the plurality of memory banks to retrieve a predetermined amount of data.

In one embodiment, the predetermined amount of data comprises an amount of data stored in one whole sub-matrix.

In one embodiment, the request retrieves a plurality of different slices from a plurality of different sub-matrices stored in a plurality of different memory banks.

In one embodiment, the request retrieves a plurality of different slices from a plurality of different sub-matrices stored in a same memory bank in a single cycle.

In one embodiment, the request retrieves a plurality of same slices from a plurality of different sub-matrices stored in a same memory bank in a plurality of cycles.

In one embodiment, the request comprises a plurality of addresses for a corresponding plurality of sub-matrices and, for each sub-matrix, a corresponding slice mask specifying slices of each sub-matrix to be retrieved.

In one embodiment, the slice mask comprises a plurality of bits corresponding to the plurality of slices of each sub-matrix.

In one embodiment, the memory banks are configured to store one or more whole sub-matrices using low address interleaving.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A circuit for storing and retrieving data comprising:
at least one memory circuit storing a first sub-matrix of data as a plurality of row slices comprising a plurality of data values and storing a second sub-matrix of data as a plurality of column slices comprising a plurality of data values; and
a fetch circuit,
wherein the fetch circuit determines row slices of the first sub-matrix of data that produce a non-zero result when multiplied by a plurality of corresponding column slices of the second sub-matrix of data, and the determined row slices are retrieved from the at least one memory circuit.

2. The circuit of claim 1, wherein the fetch circuit determines row slices of the first sub-matrix of data that produce a non-zero result when multiplied by a plurality of corresponding column slices of the second sub-matrix of data while row slices of a third sub-matrix of data that produce a non-zero result when multiplied by a plurality of corresponding column slices of the fourth sub-matrix of data are being retrieved.

3. The circuit of claim 2, wherein the first sub-matrix of data and the third sub-matrix of data are from a first matrix of data, and wherein the second sub-matrix of data and the fourth sub-matrix of data are from a second matrix of data.

4. The circuit of claim 1, wherein the at least one memory circuit stores a first mask corresponding to the first sub-matrix, wherein the first mask specifies row slices having at least one non-zero value.

5. The circuit of claim 4, wherein the fetch circuit eliminates row slices having all zero values from being retrieved based on the first mask.

6. The circuit of claim 1, wherein the fetch circuit analyzes the first sub-matrix in said at least one memory to determine the row slices that produce non-zero results.

7. The circuit of claim 6, wherein the fetch circuit determines, for a plurality of row slices, whether a particular row slice produces a zero or non-zero result when multiplied by a plurality of corresponding column slices.

8. The circuit of claim 6, wherein the fetch circuit receives a bit mask comprising 1 bit per row slice of the first sub-matrix, wherein particular row slices of the first sub-matrix having a first bit mask value indicating the particular row slices comprise all zeros are eliminated from the determined row slices to be retrieved.

9. The circuit of claim 8, further wherein, after eliminating row slices comprising all zeros, the fetch circuit determines first row slices of the first sub-matrix of data that produce a zero result when multiplied by a plurality of corresponding column slices of the second sub-matrix of data to eliminate the first row slices from the determined row slices to be retrieved.

10. The circuit of claim 8, further wherein the fetch circuit logically ANDs values of remaining non-all zero row slices of the first sub-matrix with corresponding values of the column slices of the second sub-matrix to produce a plurality of results and logically ORs the plurality of results to eliminate a plurality of non-all zero row slices producing a zero result from the determined row slices to be retrieved.

11. The circuit of claim 1, wherein the first sub-matrix is stored in row major order and the second sub-matrix is stored in column major order.

12. The circuit of claim 1, wherein the first sub-matrix is a portion of a first matrix stored in row major order and the second sub-matrix is a portion of a second matrix stored in column major order.

13. The circuit of claim 1, wherein the fetch circuit generates at least one data structure specifying said row slices that produce a non-zero result when multiplied by corresponding column slices.

14. The circuit of claim 13, wherein the fetch circuit generates a first data structure specifying addresses of a plurality of sub-matrices and a mask specifying the location of said row slices that produce a non-zero result when multiplied by corresponding column slices across within the plurality of sub-matrices.

15. The circuit of claim 14, wherein the fetch circuit generates a second data structure storing retrieved row slices and a mask specifying the location of said row slices within the plurality of sub-matrices.

16. The circuit of claim 1, wherein the at least one memory circuit is a static random access memory.

17. The circuit of claim 1, wherein the determined row slices retrieved from the at least one memory circuit are loaded into a multiplier circuit.

18. The circuit of claim 1, wherein the fetch circuit determines column slices of the second sub-matrix of data that produce a non-zero result when multiplied by a plurality of corresponding row slices of the first sub-matrix of data, and the determined column slices are retrieved from the at least one memory circuit.

19. A method of storing and retrieving data comprising:
   storing a first sub-matrix of data in at least one memory as a plurality of row slices comprising a plurality of data values;
   storing a second sub-matrix of data in the at least one memory as a plurality of column slices comprising a plurality of data values;
   determining row slices of the first sub-matrix of data that produce a non-zero result when multiplied by a plurality of corresponding column slices of the second sub-matrix of data; and
   retrieving the determined row slices from the at least one memory.

20. A non-transitory machine-readable medium storing a program executable by a computer for storing and retrieving data, the program comprising sets of instructions for:
   storing a first sub-matrix of data in at least one memory as a plurality of row slices comprising a plurality of data values;
   storing a second sub-matrix of data in the at least one memory as a plurality of column slices comprising a plurality of data values;
   determining row slices of the first sub-matrix of data that produce a non-zero result when multiplied by a plurality of corresponding column slices of the second sub-matrix of data; and
   retrieving the determined row slices from the at least one memory.

* * * * *